United States Patent
Bauer et al.

(10) Patent No.: US 6,183,037 B1
(45) Date of Patent: Feb. 6, 2001

(54) FOLDING TOP FOR A CONVERTIBLE

(75) Inventors: Dieter Bauer, Leonberg; Kurt Pfertner, Wimsheim, both of (DE)

(73) Assignee: Dr. Ing. h.c.F. Porsche AG, Weissach (DE)

(*) Notice: Under 35 U.S.C. 154(b), the term of this patent shall be extended for 0 days.

(21) Appl. No.: 09/248,991

(22) Filed: Feb. 12, 1999

(30) Foreign Application Priority Data

Feb. 12, 1998 (DE) ............................................. 198 05 657

(51) Int. Cl.[7] ...................................................... B60J 7/00
(52) U.S. Cl. ................................ 296/107.09; 296/107.01
(58) Field of Search ........................ 296/107.09, 107.01, 296/107.1, 212, 225

(56) References Cited

U.S. PATENT DOCUMENTS

| | | | |
|---|---|---|---|
| 1,826,399 | * 10/1931 | Humer | 296/107.09 |
| 2,860,913 | * 11/1958 | Kuiper et al. | 296/107.09 |
| 3,203,729 | * 8/1965 | Brynn et al. | 296/107.09 |
| 4,516,803 | * 5/1985 | Kaltz et al. | 296/107.09 |
| 4,626,021 | 12/1986 | Muscat | 296/107.11 |
| 4,818,009 | * 4/1989 | Muscat | 296/106 |
| 4,930,832 | * 6/1990 | Shelton | 296/107.09 |
| 4,964,668 | * 10/1990 | Hofmann | 296/107.06 |
| 4,991,902 | * 2/1991 | Schrader et al. | 296/107.09 |
| 5,225,747 | * 7/1993 | Helms et al. | 318/265 |
| 5,251,952 | * 10/1993 | Guckel et al. | 296/107.09 |
| 5,738,402 | * 4/1998 | Aydt et al. | 296/118 |
| 5,903,119 | * 5/1999 | Laurain et al. | 318/265 |

* cited by examiner

*Primary Examiner*—D. Glenn Dayoan
*Assistant Examiner*—Patricia Engle
(74) *Attorney, Agent, or Firm*—Evenson, McKeown, Edwards & Lenahan, P.L.L.C.

(57) ABSTRACT

A folding top for a convertible has a folding top linkage and a folding top covering carried by the folding top linkage. The folding top covering comprises at least one folding top material segment. For reducing or saving the connecting seams and the sealing measures, at least one folding top material segment is shaped by thermal deformation to a three-dimensional shape adapted to the contour of the folding top.

3 Claims, 1 Drawing Sheet

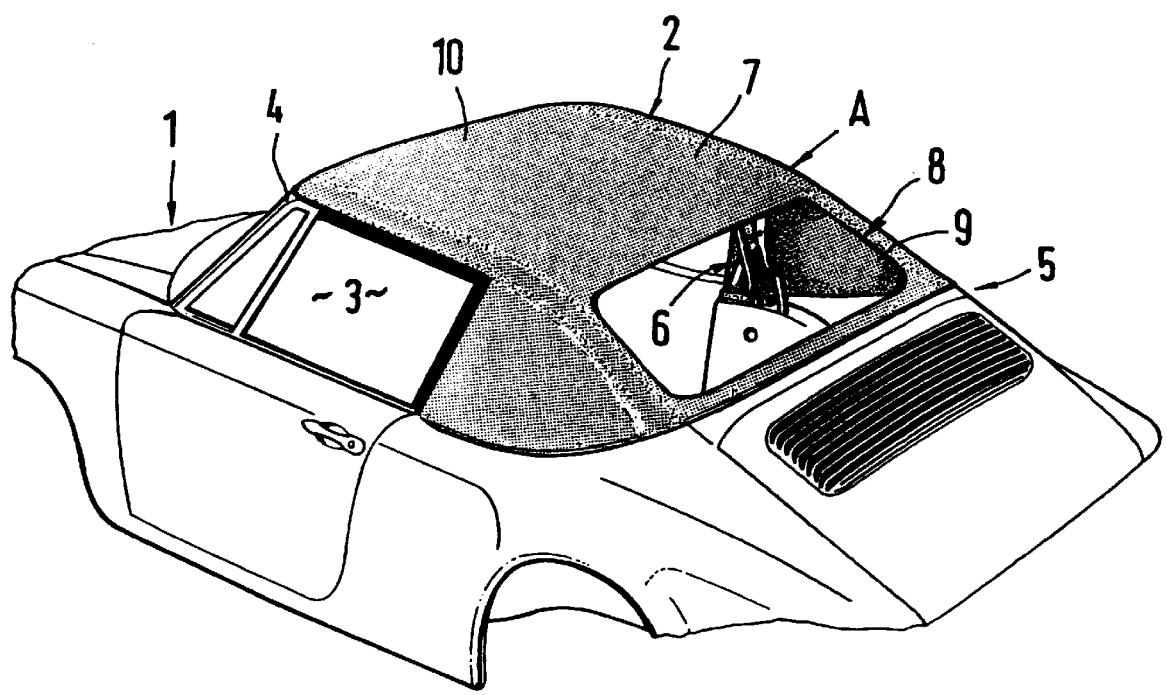

FOLDING TOP FOR A CONVERTIBLE

BACKGROUND OF THE INVENTION

This application claims the priority of German application No. 198 05 657.5, filed Feb. 12, 1998, the disclosure of which is expressly incorporated by reference herein.

The present invention relates to a folding top for a convertible, and more particularly, to a folding top which consists of a folding top linkage and a folding top covering carried by the folding top linkage, the folding top covering comprising at least one folding top material segment.

In conventional folding tops, the folding top material is processed as flat merchandise from rolls which permits a deformation only within certain limits. In order to achieve the three-dimensional shape of the later folding top covering, the complete folding top covering must be fitted together from several flat segments which are connected with one another by seams. In order to ensure water tightness, the seams must subsequently be sealed off.

SUMMARY OF THE INVENTION

An object of the present invention is to provide a folding top covering in which connection seams and sealing measures can be at least considerably reduced or completely eliminated. Thereby, the manufacturing costs are considerably reduced and, in addition, an improvement of the appearance of the folding top covering is achieved.

According to the present invention, this object has been achieved by providing a folding top wherein the at least one folding top material segment is shaped by means of thermal deforming to a three-dimensional shape adapted to the contour of the folding top.

Principal advantages achieved with the invention are that, because of the thermal deformation of the folding top material segments, the number of the connection seams as well as the sealing measures can be significantly reduced which results in lower manufacturing costs.

A folding top covering is particularly advantageous which consists only of a single, thermally deformable folding top material segment, because connecting seams and sealing measures can then be eliminated completely. The thermal deformation preferably takes place by deep-drawing the folding top material. In the case of a multilayer folding top material with an intermediate layer of synthetic caoutchouc or rubber, the thermal deformation preferably takes place in a joint operation with the vulcanizing of the intermediate layer.

BRIEF DESCRIPTION OF THE DRAWING

These and further objects, features and advantages of the present invention will become more apparent from the following detailed description of a currently preferred embodiment when taken in conjunction with the accompanying sole FIGURE wherein:

The single FIGURE is a perspective view diagonally from the rear of a convertible with a folding top according to the present invention.

DETAILED DESCRIPTION OF THE DRAWING

In the closed position A which spans the vehicle occupant compartment 3 as seen in the FIGURE, the folding top 2 extends from the windshield frame 4 to a rear area 5 of the vehicle 1 and is composed of a folding top linkage 6 and of a folding top covering 7 carried by the folding top linkage 6. In the rearward area, the folding top covering 7 has a large-surface clearance 8 for the rear window 9 which may be constructed as a rigid or flexible window.

The folding top covering 7 is preferably formed by a single folding top material segment 10, which, by means of a thermal deformation, is shaped to a three-dimensional shape adapted to the desired contour of the folding top 2. The thermal deformation of the folding top covering 7 takes place before the mounting of the folding top covering 7 on the folding top linkage 6.

However, it is also within the scope of the present invention that the folding top covering 7 is fitted together from more than one folding top material segment, in which case at least one folding top material segment will then be thermally deformed (not shown in detail). With only one folding top material segment, all connecting seams and sealing measures for the connecting seams are eliminated. The thermal deformation takes place by a conventional deep-drawing process under the effect of heat.

In the illustrated embodiment, the folding top material consists of a woven fabric having a three-layer construction, with a rubber layer of synthetic caoutchouc being provided as the intermediate layer. In such a construction of the folding top material, the thermal deformation of the folding top covering 7 can take place in one operation with the vulcanization of the intermediate layer made of synthetic caoutchouc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Folding top for a convertible, comprising a folding top linkage and a folding top covering operatively carried by the folding top linkage, the folding top covering comprising at least one folding top material segment wherein the at least one folding top material segment is thermally deformed to a three-dimensional shape adapted to a contour of the folding top, wherein the folding top covering is comprised of a multilayer folding top material with an intermediate layer of synthetic caoutchouc, with the thermal deformation taking place in one operation with vulcanization of the intermediate layer.

2. Folding top according to claim 1, wherein the folding top covering comprises only one thermally deformed folding top material segment.

3. Folding top according to claim 1, wherein the at least one folding top material segment is shaped to correspond to a mounting position by thermal deformation before being fastened on the folding top linkage.

* * * * *